United States Patent
Whiteside et al.

(10) Patent No.: US 6,578,857 B1
(45) Date of Patent: Jun. 17, 2003

(54) CREEPER WITH ADJUSTABLE PAD POSITIONS

(75) Inventors: Kirt E. Whiteside, Marion, OH (US); Terry L. Whiteside, Delaware, OH (US); Kristin C. Mays, Marion, OH (US)

(73) Assignee: Whiteside Mfg. Co., Delaware, OH (US)

(*) Notice: Subject to any disclaimer, the term of this patent is extended or adjusted under 35 U.S.C. 154(b) by 0 days.

(21) Appl. No.: 09/929,658

(22) Filed: Aug. 15, 2001

(51) Int. Cl.[7] ............................................... B25H 5/00
(52) U.S. Cl. ..................... 280/32.6; 280/639; 280/32.5
(58) Field of Search .......................... 280/32.6, 32.5, 280/32.7, 62, 639, 87.042; 5/636, 417; 297/377

(56) References Cited

U.S. PATENT DOCUMENTS

| | | | | |
|---|---|---|---|---|
| 1,274,277 A | * | 7/1918 | Kiesele | 297/118 |
| 1,593,801 A | * | 7/1926 | Koch | 280/32.6 |
| 1,639,801 A | * | 8/1927 | Heise | 280/32.6 |
| 2,250,026 A | * | 7/1941 | Laukhuff | 297/377 |
| 2,430,662 A | * | 11/1947 | Barton | 280/32.6 |
| 2,487,706 A | * | 11/1949 | Happ | 280/32.6 |
| 2,520,047 A | * | 8/1950 | Moody et al. | 280/32.6 |
| 2,564,323 A | * | 8/1951 | Brown | 280/32.6 |
| 2,650,372 A | * | 9/1953 | Lowe | 280/32.6 |
| 2,663,029 A | * | 12/1953 | Whitley | 297/377 |
| 2,666,216 A | * | 1/1954 | Schnaitter | 5/634 |
| 2,689,744 A | * | 9/1954 | Mullin | 188/5 |
| 2,692,636 A | * | 10/1954 | Morrison | 280/30 |
| 3,148,892 A | * | 9/1964 | Merriott | 280/32.6 |
| 3,211,495 A | * | 10/1965 | Nielsen | 297/68 |
| 3,276,817 A | * | 10/1966 | Marple | 297/283.1 |
| 3,292,189 A | * | 12/1966 | Parker et al. | 5/634 |
| 3,565,419 A | * | 2/1971 | Allard | 297/377 |
| 3,800,338 A | * | 4/1974 | Smith | 297/377 |
| 4,307,477 A | * | 12/1981 | Jacobsen | 5/618 |
| 5,108,118 A | * | 4/1992 | Schaevitz | 280/32.6 |
| 5,160,185 A | * | 11/1992 | Stang | 297/377 |
| 5,547,256 A | * | 8/1996 | D'Antuono et al. | 280/642 |
| 5,611,552 A | * | 3/1997 | Miles et al. | 280/32.5 |
| 5,829,077 A | * | 11/1998 | Neige | 5/618 |
| 5,868,461 A | * | 2/1999 | Brotherston | 297/84 |
| D406,683 S | | 3/1999 | Taylor et al. | |
| 6,095,532 A | * | 8/2000 | Martin | 280/30 |

FOREIGN PATENT DOCUMENTS

| | | | | |
|---|---|---|---|---|
| FR | 2635665 A1 | * | 3/1990 | A47C/20/04 |
| GB | 2198994 A | * | 6/1988 | B62B/11/00 |
| SE | WO8809709 | * | 5/1988 | B25H/5/00 |

OTHER PUBLICATIONS

Mac Tools advertisement, p. 179 (undated).
Rel advertisement "Steel Creepers", 1 page (undated).
Whiteside Catalog 97, 2 pages, (1997).
Whiteside Manufacturing Company, Inc. product catalog, 2 pages (2000).

* cited by examiner

Primary Examiner—Brian L. Johnson
Assistant Examiner—Kelly Campbell
(74) Attorney, Agent, or Firm—Renner, Kenner, Greive, Bobak, Taylor & Weber

(57) ABSTRACT

A creeper (10) includes a main frame (11) which is rendered mobile by caster assemblies (14, 15, 16). A pivot frame (22) is pivotally attached to the main frame (11) and carries a pad section (19). Another pivot frame (28) is pivotally attached to the main frame (11) and carries another pad section (20). A floating frame holding mechanism (50) is provided to maintain a selected pivotal position of the pivot frame (22) relative to the main frame (11), and a frame holding mechanism (34) is provided to maintain a selected pivotal position of the other pivot frame (28) relative to the main frame (11).

20 Claims, 4 Drawing Sheets

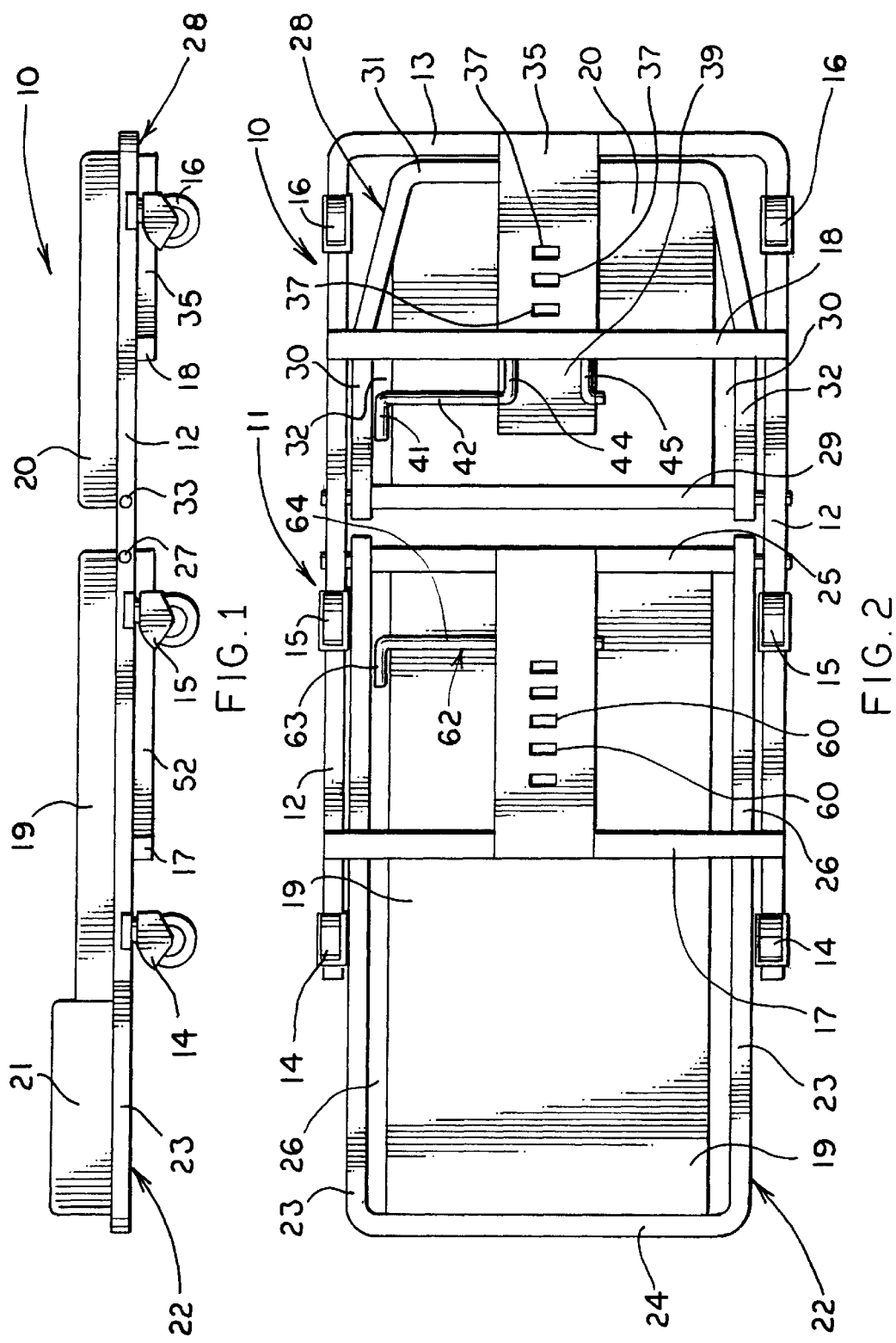

CREEPER WITH ADJUSTABLE PAD POSITIONS

TECHNICAL FIELD

This invention relates to a creeper such as is typically used by a mechanic when working in areas of low headroom such as under a vehicle. More particularly, this invention relates to a creeper having pad sections which may be folded to and maintained at multiple positions rendering the creeper comfortably usable in areas where headroom is not a primary concern.

BACKGROUND ART

Creepers have long been used by mechanics or the like when working in areas having little headroom, such as underneath a vehicle. Typically, the creeper consists of a wheeled frame which carries a pad upon which the user may lay prone and maneuver himself under the vehicle or the like to work on it while still lying prone.

A problem with these conventional creepers is that they are only useful to work in areas where lying prone is required because of the lack of headroom. To work on other areas in comfort, a separate device such as a seat or the like is often required. In an attempt to save the expense of utilizing a separate device, creepers have been designed, such as shown in U.S. Pat. No. 5,451,068, which can be converted to a chair having a generally horizontal seating surface and a generally vertically oriented backrest. While these devices do provide comfort for the user in one position, their construction adds much to the cost of the creeper, rendering it impractical for all users.

A less expensive creeper has been designed which is provided with a hinged pad such that a portion of the pad may be pivoted relative to the other portion which remains horizontal. A clip or some other type of device may be utilized to maintain the pivoted pad portion at its desired location, and the user may then sit on the horizontal portion, having his back supported by the pivoted portion. The problems associate with these creepers are that they are somewhat flimsy, they are generally not multi-positionable, they cannot readily be manipulated when the user is on the creeper, and the active user will tend to slide off the generally horizontal portion.

Thus, the need exists for a creeper whose configuration can be easily adjusted based on the specific desire of the user.

DISCLOSURE OF THE INVENTION

It is thus an object of the present invention to provide a creeper which can be reconfigured into a multiplicity of seating conditions.

It is another object of the present invention to provide a creeper, as above, in which the pad is divided into sections and in which more than one pad section may be tilted from horizontal.

It is a further object of the present invention to provide a creeper, as above, in which the pad sections may be locked in place at the desired position.

It is an additional object of the present invention to provide a creeper, as above, in which the position of the pads can be easily adjusted and/or changed by the user.

It is yet another object of the present invention to provide a creeper, as above, which is affordable and easy to use and manipulate.

These and other objects of the present invention, as well as the advantages thereof over existing prior art forms, which will become apparent from the description to follow, are accomplished by the improvements hereinafter described and claimed.

In general, a creeper made in accordance with one aspect of the present invention includes a first frame. A second frame carries a first pad section and is pivotally attached to the first frame so that the first pad section may be pivoted relative to the first frame. A third frame carries a second pad section and is pivotally attached to the first frame so that the second pad section may be pivoted relative to the first frame. Means are provided to maintain a selected pivoted position of the second frame, and means are also provided to maintain a selected pivoted position of the third frame.

In accordance with another aspect of the present invention, a creeper includes a frame, a first pad section and a second pad section. At least one of the pad sections is pivotable to a selected position relative to the frame. A mechanism which holds that pad section at the selected position includes a control rod having a handle operable by the user of the creeper.

A preferred exemplary creeper incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a somewhat schematic side elevational view of a creeper made in accordance with the present invention.

FIG. 2 is a bottom plan view of the creeper of FIG. 1.

PREFERRED EMBODIMENT FOR CARRYING OUT THE INVENTION

Figure 3:
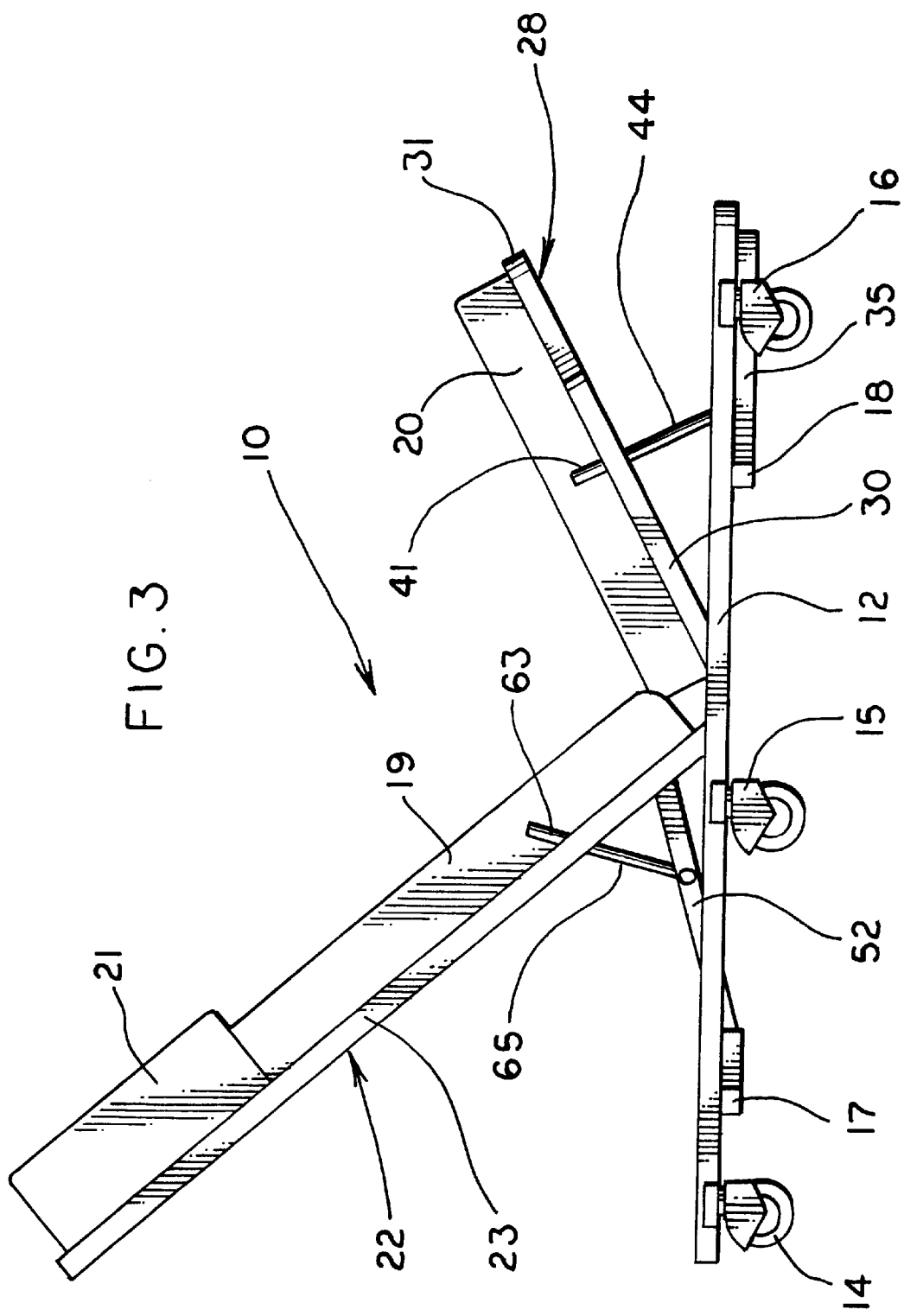
FIG. 3 is a somewhat schematic side elevational view showing the creeper of FIG. 1 having its pad sections pivoted relative to the frame.

A creeper made in accordance with the present invention is indicated generally by the numeral 10 and includes a main frame generally indicated by the numeral 11. Main frame 11 includes longitudinally extending, laterally spaced side rails 12 joined at one end by an end rail 13. Frame 11 is rendered mobile by a plurality of caster assemblies 14, 15 and 16. Caster assemblies 14 are positioned on side rails 12 near one longitudinal end thereof, caster assemblies 15 are positioned on side rails 12 generally longitudinally, centrally thereof, and caster assemblies 16 are positioned on side rails 12 near the other longitudinal end thereof, generally adjacent to end rail 13. A crossbar 17 extends laterally between side rails 12 generally adjacent to caster assemblies 14 and another crossbar 18 extends laterally between side rails 12 generally adjacent to caster assemblies 16.

Creeper 10 also includes an upper body pad section 19 and a lower body pad section 20. As shown in FIG. 1, when in the creeper configuration, pad sections 19 and 20 are slightly longitudinally spaced from each other to provide clearance so that they can be pivoted to the FIG. 3 position as will be hereinafter described. Pad section 19 includes a headrest portion 21 such that when creeper 10 is in the FIG. 1 position, portion 21 is adapted to receive the head of the user. Otherwise, pad sections 19 and 20 are of the same thickness to receive the body of the user. Specifically, pad section 19 is generally designed to receive the body of the user from the waist up, and pad section 20 receives at least the upper portion of the legs of the user.

Figure 5:
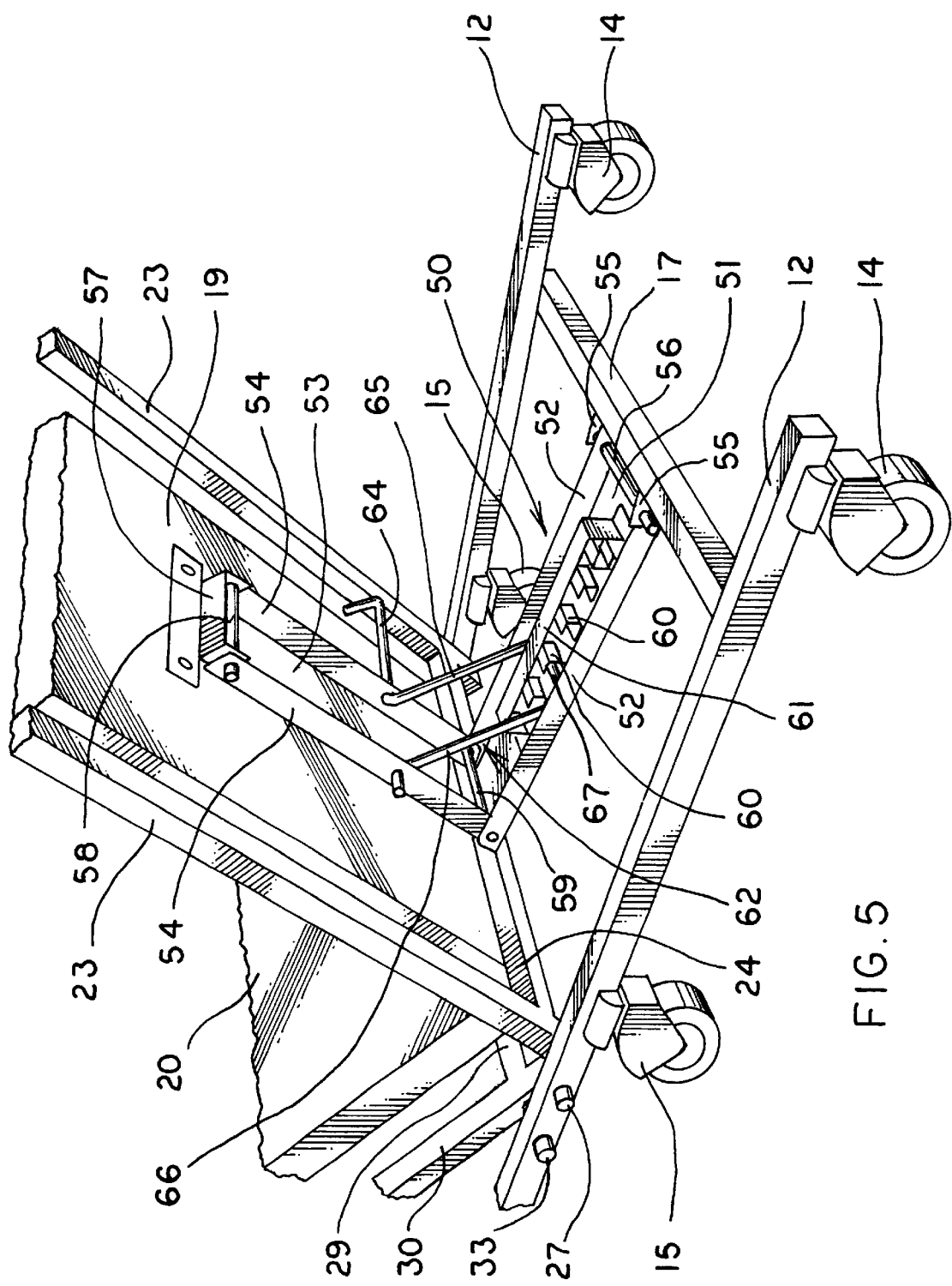
FIG. 5 is a fragmented perspective view showing the mechanism which holds the other pad section in one of its pivoted positions.

Pad section 19 is carried by a pivot frame generally indicated by the numeral 22. Pivot frame 22 includes opposed longitudinally extending side bars 23 interconnected at one end by an end bar 24 and at the other end by an opposed end bar 25. Pad portion 19 is carried by end bars 24 and 25 and is preferably slightly spaced from side bars 23, as at space 26. Pivot frame 22, and thus pad section 19, are rendered pivotable with respect to main frame 11 of creeper 10 by means of pivot pins 27 (one shown) extending from pivot frame 22 and through side rail 12. Thus, pivot frame 22 is pivotable from a first position wherein its side bars 23 are flush with side rails 12 and are resting on crossbar 17, as shown in FIG. 1, to a second position where it is no longer supported by crossbar 17, as shown in FIGS. 3 and 5.

Pad section 20 is carried by a pivot frame generally indicated by the numeral 28. Pivot frame 28 includes a laterally extending bar 29 which carries the opposed branches 30 of a generally U-shaped bar generally indicated by the numeral 31. Pad section 20 may be attached to end bar 29 and U-shaped bar 31 such that, like pad section 19, its lateral edges are spaced, as at 32, from branches 30 of bar 31. Pivot frame 28, and thus pad section 20, are rendered pivotable with respect to main frame 11 of creeper 10 by means of pivot pins 33 (one shown) extending from pivot frame 28 and through side rails 12. Thus, pivot frame 28 is pivotable from a first position wherein its branches 30 and U-shaped bar 31 are flush with side rails 12 and resting on crossbar 18, as shown in FIG. 1, to a second position where it is no longer supported by crossbar 18, as shown in FIGS. 3 and 4.

Figure 4:
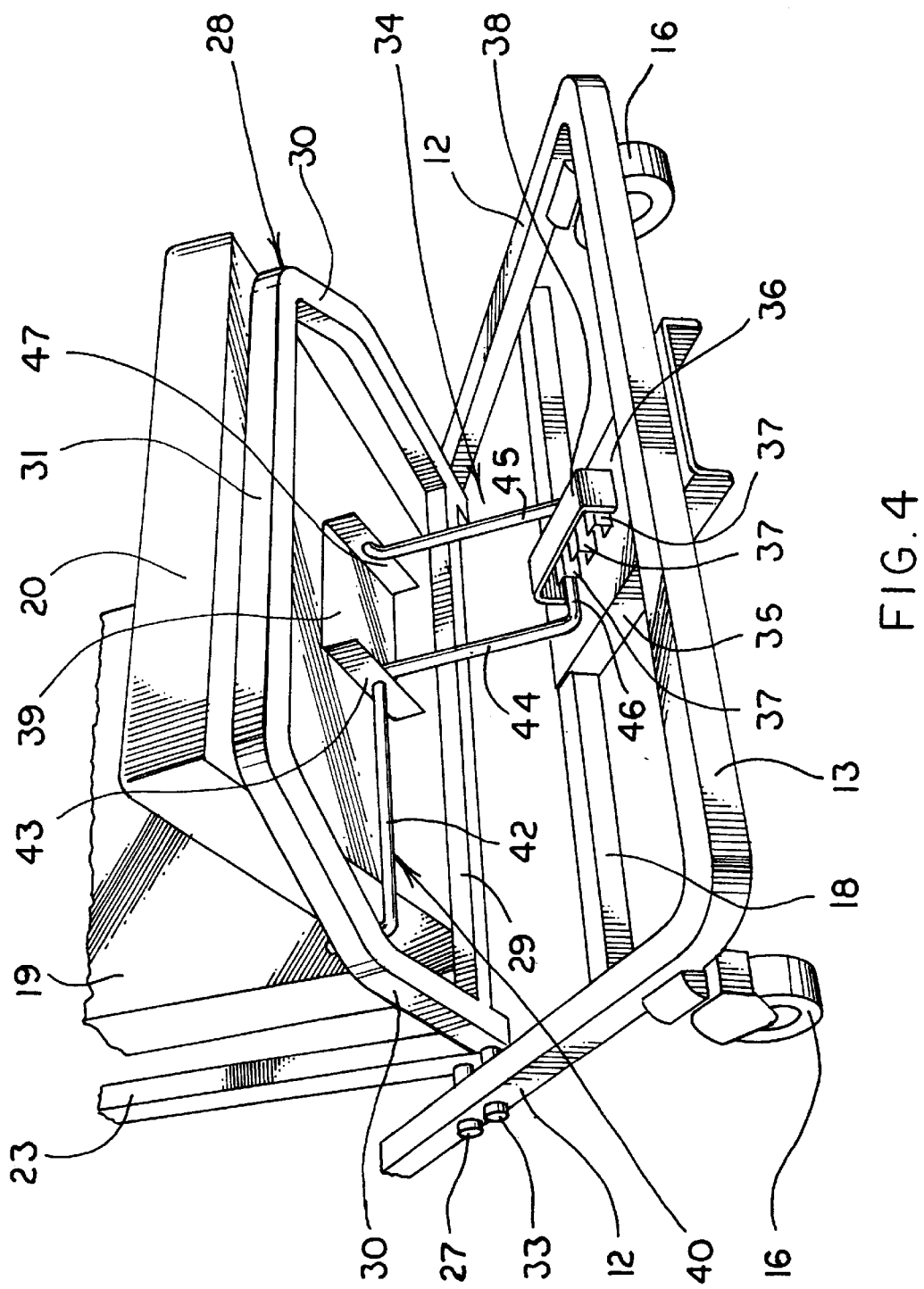
FIG. 4 is a fragmented perspective view showing the mechanism which holds one of the pad sections in one of its pivoted positions.

The manner in which pivot frame 28 is maintained at a selected position when pivoted away from crossbar 18 is best shown in FIG. 4. There, a frame holding mechanism is generally indicated by the numeral 34 and includes a plate 35 attached between end rail 13 and crossbar 18. Plate 35 has an upper surface 36 on which are formed a plurality of spaced stop catches 37. A cover bracket 38 is attached to upper surface 36 and is thereby positioned over stop catches 37.

Frame holding mechanism 34 also includes a support bracket 39 which is attached to the underside of pad section 20. Bracket 39 carries and otherwise positions a control rod generally indicated by the numeral 40. Control rod 40 is formed of a continuous rod material, preferably metallic, and starts at one end as a handle 41 which extends upwardly through space 32 (FIGS. 1–3) between pad section 20 and branch 30 of pivot frame 28 so as to ,be readily accessible to the user of creeper 10. From handle 41, rod 40 turns and includes a segment 42 which runs underneath pad section 20 toward and through a flange 43 in bracket 39. The remaining portion of rod 40 is generally U-shaped having opposed branches 44 and 45 interconnected by a lock portion 46. Thus, branch 44 extends from segment 42 toward plate 35, and branch 45 extends from plate 35 back toward bracket 39 where it turns and extends through flange 47 thereof. While rod 40 is rotatably received through flanges 43 and 47 of bracket 39, it is maintained laterally in the position just described by a cotter pin or equivalent device (not shown) extending through the end of branch 45 that is adjacent to flange 47.

Lock portion 46 of rod 40 is captured between cover bracket 38 and surface 36 of plate 35, and, as a result, is adapted to be selectively positioned so as to be engaged by one of the stop catches 37 to maintain pad section 20 at a height (and angle) dependent on the catch 37 selected. When creeper 10 is in the flat creeper configuration shown in FIG. 1, to position pad section 20 in, for example, the FIG. 3 configuration, one need only grasp pad section 20 or bar 31 and pivot frame 28 on pins 33 at which time lock portion 46 of rod 40 is moving between the top of stop catches 37 and cover bracket 38 until it is allowed to drop downwardly onto upper surface 36 of plate 35. To that end, upon release, under the influence of the weight of pad section 20, lock portion 46 will move under and adjacent to a catch 37 will be be maintained at that location to hold pad section 20 at the desired elevation and angle as shown in FIGS. 3 and 4. Manipulation of rod handle 41 will rotate rod 40 to move lock portion 46 out of engagement with a stop catch 37 so that pad section 20 may be lowered to the FIG. 1 position or may be positioned to engage another stop catch 37.

The manner in which pivot frame 22 is maintained at a selected position when pivoted away from crossbar 17 is best shown in FIG. 5. There, a floating frame holding mechanism is generally indicated by the numeral 50 and includes an arm 51 having sidewalls 52, and another arm 53 having sidewalls 54. Arm 51 has one end pivotally attached to crossbar 17. To that end, crossbar 17 carries a bracket 55, and a pivot pin 56 extends through arm sidewalls 52 so that arm 51 may pivot relative to crossbar 17. Arm 53 has one end pivotally attached to pivot frame 22 via pad section 19. To that end, a bracket 57 is attached to the underside of pad section 19, and it carries a pivot pin 58 which is received through arm sidewalls 54. As a result, arm 53 may pivot relative to pad section 19 and pivot frame 22. The other end of arm 51 is attached to the other end of arm 53 by means of a pivot pin 59 extending through sidewalls 52 and sidewalls 54. Thus, arms 51 and 53 are pivotable relative to each other as well as being pivotable with respect to crossbar 17 and pivot frame 22, respectively, in a floating-like manner.

Floating frame holding mechanism 50 also includes a plurality of spaced stop catches 60 formed on the surface of arm 51. A cover bracket 61 is attached to arm 51 and is positioned over stop catches 60. Mechanism 50 is also provided with a control rod, generally indicated by the numeral 62, which is similar to control rod 40 previously described. Thus, rod 62 is a continuous member, preferably formed of a metallic material, which starts at one end as a handle 63 (FIGS. 1–3) which extends upwardly through space 26 between pad section 19 and side bars 23 so as to be readily accessible to the user of creeper 10. From handle 63, rod 62 turns and includes a segment 64 which runs underneath pad section 19 toward and through one sidewall 54 of arm 53. The remaining portion of rod 62 is generally U-shaped having opposed branches 65, 66 interconnected by a lock portion 67. Thus, branch 65 extends from segment 64 toward arm 51, and branch 66 extends from arm 51 back toward arm 53 where it turns and extends through the other sidewall 54 thereof. While rod 62 is rotatably received through sidewalls 54, it is maintained laterally in the position just described by a cotter pin or equivalent device (not shown) extending through the end of branch 66 that has extended through sidewall 54.

Lock portion 67 of rod 62 is captured between cover bracket 61 and arm 51, and, as a result, is adapted to be selectively positioned so as to be engaged by one of the stop catches 60 to maintain pad section 19 at a height (and angle)

dependent on the catch 60 selected. When creeper 10 is in the flat creeper configuration shown in FIG. 1, to position pad section 19 in, for example, the FIG. 3 configuration, one need only grasp pad section 19 and pivot frame 22 on pins 27 at which time lock portion 67 of rod 62 is moving between the top of stop catches 60 and cover bracket 61 until it is allowed to drop downwardly onto upper arm 51. To that end, upon release, under the influence of the weight of pad section 19, lock portion 67 will move under and adjacent to a catch 60 and will be maintained at that location to hold pad section 19 at the desired elevation and angle as shown in FIGS. 3 and 5. Manipulation of rod handle 63 will rotate rod 62 to move lock portion 67 out of engagement with a stop catch 60 so that pad section 19 may be lowered to the FIG. 1 position or may be positioned to engage another stop catch 60.

In view of the foregoing, it should thus be evident that a creeper 10 made in accordance with the present invention, as described hereinabove, can be readily converted from a pure creeper configuration (FIG. 1) wherein the user may lie prone thereon, to one of many other configurations. For example, if desired, pad section 19 may alone be pivoted and raised to one of a plurality of positions dependent on the number of stop catches 60 which are provided. Or pad section 20 may alone be pivoted and raised to one of a plurality of positions dependent on the number of stop catches 37 which are provided. Still alternatively, both pad sections 19 and 20 may be pivoted and raised to any combination of positions, as desired, one of which being shown in FIG. 3. As a result, it should be evident that creeper 10 accomplishes the objects of the present invention and otherwise substantially improves the art.

What is claimed is:

1. A creeper comprising a first frame, a first pad section, a second pad section, a second frame carrying said first pad section and being pivotally attached to said first frame so that said first pad section may be pivoted relative to said first frame, a third frame carrying said second pad section and being pivotally attached to said first frame so that said second pad section may be pivoted relative to said first frame, the pivotal movement of said first and second pad sections being independent of each other so that either or both of said first and second pad sections may be pivoted, said first pad section being spaced from a portion of said second frame, first means to maintain a selected pivoted position of said second frame, said first means including a control rod having a handle operable by the user of the creeper, the majority of said control rod being positioned below said first pad section, said handle extending upwardly through the space between said first pad section and said second frame, and second means to maintain a selected pivoted position of said third frame, said first and second means being operable independent of each other.

2. A creeper according to claim 1 wherein said first means includes a plurality of stop catches and said control rod includes a lock portion selectively engaging one of said stop catches.

3. A creeper comprising a first frame, a first pad section, a second pad section, a second frame carrying said first pad section and being pivotally attached to said first frame so that said first pad section may be pivoted relative to said first frame, a third frame carrying said second pad section and being pivotally attached to said first frame so that said second pad section may be pivoted relative to said first frame, the pivotal movement of said first and second pad sections being independent of each other so that either or both of said first and second pad sections may be pivoted, first means to maintain a selected pivoted position of said second frame, and second means to maintain a selected pivoted position of said third frame, said first and second means being operable independent of each other, said first means including a plurality of stop catches, a control rod having a lock portion selectively engaging one said stop catch, and a cover bracket having a portion positioned over said stop catches, said lock portion of said control rod being confined between said cover bracket and said stop catches.

4. A creeper according to claim 3 wherein said first means includes a bracket rotatably carrying said control rod.

5. A creeper according to claim 4 wherein said control rod includes a handle portion which may be manipulated to rotate said control rod with respect to said bracket and to move said lock portion relative to said stop catches.

6. A creeper comprising a first frame, a first pad section, a second pad section including a headrest, a second frame carrying said first pad section and being pivotally attached to said first frame so that said first pad section may be pivoted relative to said first frame, a third frame carrying said second pad section and being pivotally attached to said first frame so that said second pad section may be pivoted relative to said first frame, said second pad section being spaced from a portion of said third frame, the pivotal movement of said first and second pad sections being independent of each other so that either or both of said first and second pad sections may be pivoted, first means to maintain a selected pivoted position of said second frame, and second means to maintain a selected pivoted position of said third frame, said first and second means being operable independent of each other.

7. A creeper according to claim 6 wherein said second means includes a control rod the majority of which is positioned below said second pad section, said control rod having a handle extending upwardly through the space between said second pad section and said third frame.

8. A creeper comprising a first frame, a first pad section, a second pad section, a second frame carrying said first pad section and being pivotally attached to said first frame so that said first pad section may be pivoted relative to said first frame, a third frame carrying said second pad section and being pivotally attached to said first frame so that said second pad section may be pivoted relative to said first frame, first means to maintain a selected pivoted position of said second frame, and second means to maintain a selected pivoted position of said third frame, said second means including a first arm pivotally connected to said first frame and a second arm pivotally connected to said second pad section.

9. A creeper according to claim 8 wherein said first arm and second arm are pivotally attached to each other.

10. A creeper according to claim 8 wherein said second means includes a control rod rotatably carried by said second arm.

11. A creeper according to claim 10 wherein said first arm includes a plurality of stop catches, said control rod having a lock portion selectively engaging a said stop catch.

12. A creeper according to claim 11 wherein said second means includes a cover bracket having a portion positioned over said stop catches, said lock portion of said control rod being confined between said cover bracket and said stop catches.

13. A creeper according to claim 12 wherein said control rod includes a handle portion which may be manipulated to rotate said control rod with respect to said second arm and to move said lock portion relative to said stop catches.

14. A creeper comprising a frame, a first pad section, a second pad section, at least one of said pad sections being pivotable to a selected position relative to said frame, and a mechanism for holding said one of said pad sections at the selected position, said mechanism including a control rod having a handle extending upwardly to a position above said frame, adjacent to a side of said one of said pad sections, and between said one of said pad sections and said frame so that said handle may be readily operable by the user of the creeper.

15. A creeper according to claim 14 wherein said mechanism includes a plurality of stop catches, said control rod having a lock portion for selectively engaging a said stop catch.

16. A creeper according to claim 15 wherein said mechanism includes a cover bracket having a portion positioned over said stop catches, said lock portion of said control rod being confined between said cover bracket and said stop catches.

17. A creeper comprising a frame; a first pad section; a second pad section; at least one of said pad sections being pivotable to a selected position relative to said frame; and a mechanism for holding said one of said pad sections at the selected position; said mechanism including a plurality of stop catches, a control rod having a handle operable by the user of the creeper, a lock portion for selectively engaging one of said stop catches, a first arm pivotally connected to said frame and a second arm pivotally connected to said one of said pad sections.

18. A creeper according to claim 17 wherein said first arm and second arm are pivotally attached to each other.

19. A creeper according to claim 18 wherein said control rod is rotatably carried by said second arm.

20. A creeper according to claim 19 wherein said first arm carries said stop catches.

* * * * *